US010097654B2

(12) United States Patent
Zhou et al.

(10) Patent No.: US 10,097,654 B2
(45) Date of Patent: Oct. 9, 2018

(54) IDENTIFYING USERS OF CLIENT DEVICES FOR TRACKING USER INTERACTIONS WITH CONTENT DISTRIBUTED BY CONTENT PROVIDER SYSTEMS

(71) Applicant: Facebook, Inc., Menlo Park, CA (US)

(72) Inventors: Li Zhou, Campbell, CA (US); Aleksey Sergeyevich Fadeev, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 181 days.

(21) Appl. No.: 15/172,040

(22) Filed: Jun. 2, 2016

(65) Prior Publication Data

US 2017/0353564 A1  Dec. 7, 2017

(51) Int. Cl.
*G06F 15/173* (2006.01)
*H04L 29/08* (2006.01)
*H04B 1/3827* (2015.01)

(52) U.S. Cl.
CPC .......... *H04L 67/22* (2013.01); *H04B 1/3833* (2013.01); *H04L 67/02* (2013.01); *H04L 67/10* (2013.01)

(58) Field of Classification Search
CPC ......... H04L 67/22; H04L 67/10; H04L 67/02; H04B 1/3833
See application file for complete search history.

(56) References Cited

U.S. PATENT DOCUMENTS

| | | | |
|---|---|---|---|
| 8,209,380 B2* | 6/2012 | Tiu, Jr. ................ | G06F 17/3089 709/203 |
| 8,590,014 B1* | 11/2013 | Haugsnes ............... | G06F 21/31 726/3 |
| 9,787,628 B2* | 10/2017 | Wiseman ................ | H04L 51/32 |
| 2012/0166520 A1* | 6/2012 | Lindsay ............ | G06Q 30/0241 709/203 |
| 2014/0257999 A1* | 9/2014 | Garcia-Martinez ......................... G06Q 30/0275 705/14.71 |
| 2016/0080485 A1* | 3/2016 | Hamedi ................. | H04L 67/02 709/204 |
| 2016/0260129 A1 | 9/2016 | Fadeev et al. | |
| 2017/0169425 A1* | 6/2017 | Metral ............... | G06Q 20/3829 |
| 2017/0171125 A1* | 6/2017 | Chow .................... | H04L 51/08 |
| 2017/0337276 A1* | 11/2017 | Obenzinger ...... | G06F 17/30864 |

* cited by examiner

*Primary Examiner* — Michael A Keller
(74) *Attorney, Agent, or Firm* — Fenwick & West LLP

(57) ABSTRACT

An online system tracks identities of users that interact with the online system. The online system sends a browser identifier for storing on a client device that interacts with the online system. The browser identifier uniquely identifies a browser of the client device used for interacting with the online system. A content provider system receives the browser identifier from the client device and uses the browser identifier for logging user actions associated with content provided by the content provider system. The content provider system sends user action logs to the online system and the online system determines users that used the client device at a timestamp associated with the user action log. The online system provides the user identifiers to the content provider system. The content provider system uses the user identifiers to generate reports.

14 Claims, 5 Drawing Sheets

Match Table 400

| Event type | Browser ID | Timestamp | Hashed user ID |
|---|---|---|---|
| Impression | abc | 11/30/2105 12:30 PM | a10bdzz  410 |
| Conversion | def | 11/24/2015 11:00 AM | a10bdzz |
| Conversion | ghi | 01/10/2016 10:00 AM | Xyz11 |
| Conversion | jkl | 02/10/2016 11:00 AM | Efg12 |

FIG. 4

IDENTIFYING USERS OF CLIENT DEVICES FOR TRACKING USER INTERACTIONS WITH CONTENT DISTRIBUTED BY CONTENT PROVIDER SYSTEMS

BACKGROUND

This disclosure relates in general to tracking user interactions with content items distributed by content provider systems, and in particular, to determining identity of a user interacting with content from a content provider system for accurate tracking of user interactions.

Systems that provide content, for example, content distribution systems and publishing systems track interactions of users with content items to analyze distribution of the content items. Tracking user interactions requires identifying users that performed these interactions. Online systems typically track user identities by requiring users to identify themselves before performing interactions, for example, by logging in and providing credentials. However, users may not prefer to provide their credentials every time they perform a user interaction. Requiring users to log in to the online system for every interaction may result in a poor user experience, thereby discouraging user interactions with the online system.

Another technique conventionally used by online systems to determine user identity is to store information on a client device identifying the user, for example, as cookies. This information is accessed by the online system to identify the user of the client device. However user identity determined using information stored on the client devices can be inaccurate. For example, cookies may often be deleted by a client device. Furthermore, a client device may be shared by multiple users. As a result the online system receives the same cookie even if different users are using the client device for different interactions. As a result, online systems are often unable to accurately identify the users that performed the user interactions. The accuracy with which the system can identify the users performing specific user actions determines the accuracy of reports analyzing the user interactions. Due to inaccuracies in the identification of users, reports describing user actions often comprises inaccurate information.

SUMMARY

An online system stores information describing user interactions with the online system, for example, as logs. The stored information that allows the online system to determine a user of the online system that used a browser at a given time, for example, based on user login information. The online system may identify the user of a browser even if the browser is shared by multiple users or if the same user interacts with the online system using multiple browsers.

The online system generates a browser identifier and sends it for storing on a client device interacting with the online system. A content provider system provides content for presentation using browsers executing on client devices and receives the browser identifier stored on the client device in association with user interactions with the content. The content provider system stores action logs describing user actions with content provided by the content provider system. For example, an action log of the content provider system may store information describing a type of the user action, a browser identifier received from the browser used to perform the user action, and a timestamp value indicating a time associated with the user action. Due to sharing of browsers and use of multiple browsers by the same users, a report generated by the content provider system based on the browser identifiers does not accurately represent user interactions by users with content provided by the content provider system. To perform accurate analysis, the content provider system receives from the online system, accurate information identifying users of the online system that used a particular browser at various points in time. The content provider system sends the action logs to the online system. The online system identifies users of the online system that are likely to have performed the user actions stored in the action logs. The online system sends an identifier of a user for each action log received. The content provider system uses the received user identifiers to generate reports analyzing the user interactions.

In an embodiment, the browser identifier stored in a local storage of the client device, cannot be accessed by web pages received by the browser from systems other than the online system. For example, the browser identifier may be stored as a cookie that can only be accessed by the online system. The online system sends a message to the client device that allows the browser to access the browser identifier and provide it to the content provider system.

BRIEF DESCRIPTION OF THE DRAWINGS

FIG. 4 is an illustrative example of match table indicating the matching of an event with the browser identifier, timestamp, and hashed user identifier.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1A:
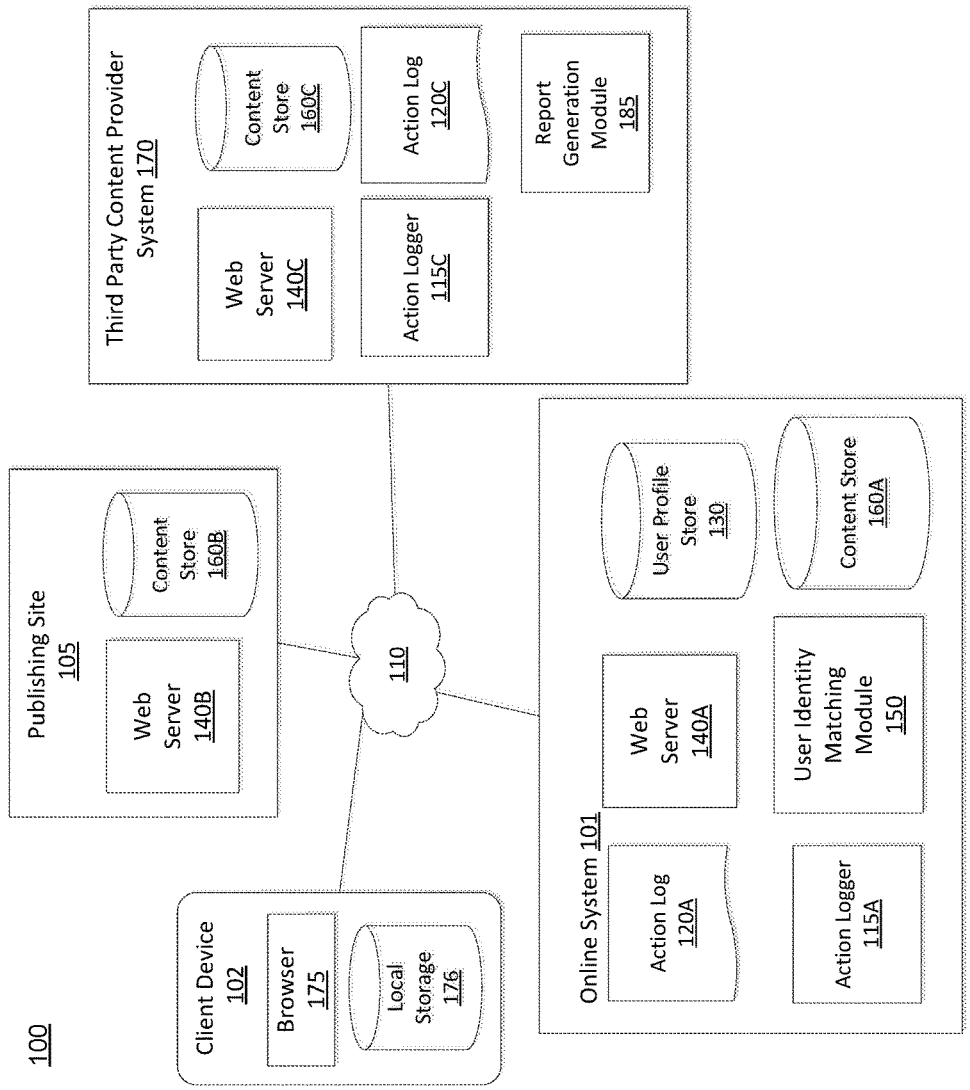
FIG. 1A shows a system environment illustrating the interactions between an online system, a third party content provider system, a publishing site, and one or more client devices, interacting with each other via a network, according to an embodiment.

FIG. 1A shows a system environment illustrating the interactions between an online system, a third party content provider system, a publishing site, and one or more client devices, interacting with each other via a network, according to an embodiment. In various embodiments, each of the publishing site 105, the online system 101, and the third party content provider system 170 may include additional, fewer, or different components for various applications. Conventional components such as network interfaces, security functions, load balancers, failover servers, management and network operations consoles, and the like are not shown so as to not obscure the details of the system architecture.

A client device 102 is a computing device configured to receive user input as well as transmitting and/or receiving data via the network 110. In one embodiment, the client device 102 is a conventional computer system, such as a desktop or laptop computer. Alternatively, a client device 102 may be a device having computer functionality, such as a personal digital assistant (PDA), a mobile telephone, a smartphone or another suitable device. In one embodiment, a client device 102 executes an application allowing a user of the client device 102 to interact with the online system 101. For example, a client device 102 executes a browser application (also referred to as a browser) to enable interaction between the client device 102 and the online system 101 or between the client device 102 and the publishing site 105 via the network 110. In another embodiment, a client device 102 interacts with the online system 101 through an application programming interface (API) running on a native operating system of the client device 102, such as IOS® or ANDROID™.

A client device 102 is configured to communicate via the network 110, which may comprise any combination of local area and/or wide area networks, using both wired and/or wireless communication systems. In one embodiment, the network 110 uses standard communications technologies and/or protocols. For example, the network 110 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any suitable format, such as hypertext markup language (HTML) or extensible markup language (XML). In some embodiments, all or some of the communication links of the network 110 may be encrypted using any suitable technique or techniques.

The client device 102 includes a local storage 176 for storing data. The local storage may store data associated with browser 175. The browser receives web pages from various systems and executes instructions based on the web pages. In an embodiment, the browser 175 stores data received from various online systems in the local storage, for example, for caching data for fast access, or for storing cookies of various websites or online systems. The local storage 176 stores cookies representing data received from an online system that is stored on the client device that may be provided to the online system when the client device sends requests to the online system. For example, an online system may store user preferences as cookies.

The local storage 176 allows web pages received from an online system 101 to store data while executing certain instructions/code. The browser application 175 enforces access control or security such that a web page from a particular online system 101 is not allowed to access data stored in a portion of storage space allocated for a different online system 101. In an embodiment, each online system 101 stores data on the client device 102 as cookies. Accordingly, the browser 175 does not allow web pages from one online system to access cookies stored for another online system.

The publishing site 105 provides the content to client devices 102. The content provided by a publishing site may include text, images, videos, audio, or combination of various media types. In an embodiment, the publishing site 105 includes a web server 140B and a content store 160B. The publishing site 105 receives requests for content or request for web pages from client devices 102. The web server 140B processes the received requests by configuring a web page for sending to the client device that requested the webpage. The web server 140B includes content from content store 160B in the web page. The web server 140B sends the configured web page for presentation via the browser 175 of the client device 102. The browser 175 of the client device 102 receives the web page and renders the web page for presentation via a display screen of the client device 102.

In an embodiment, the publishing site 105 receives content from the third party content provider system 170 and includes the content in the web page sent to the client device 102. In an embodiment the publishing site 105 sends a request to the third party content provider system 170 identifying the content to be included in the web page being configured for presentation via the browser 175. In other embodiments, the publishing site 105 sends one or parameters associated with various content items and the third party content provider system 170 selects a content for including in the web page based on a matching of the one or more parameters with information describing the content. The parameters may describe the content of the web page requested by the user or information received from the user, for example, one or more keywords or terms occurring in the web page. In some embodiments, the third party content provider system 170 determines the content to be included in the webpage based on information associated with the various content items, for example, a number of times that a content item was previously included in webpages, or a time (or time range) associated with the content item during which the content is suggested to be included in web pages. For example, the third party content provider system 170 may store a rate of distribution of the content in web pages of publishing sites 105. The third party content provider system 170 determines whether to include the content item in a web page of a publishing site 105 based on the rate.

The third party content provider system 170 includes a web server 140C, content store 160C, action logger 115C, action log 120C, and a report generation module 185. The content store 160C stores content that is provided to publishing sites 105 for including in the web pages provided by the publishing site 105 to client devices.

The web server 140C receives requests for content from the publishing site 105 and sends content for including in the web pages provided by the publishing site 105. The third party content provider system 170 may directly send content to a client device for presentation via the browser 175. In an embodiment, the web server 140C includes tracking pixels in the content provided to the publishing sites 105 such that when the content is presented via the browser 175 of the client device 102, a particular program or code (or set of instructions) is executed by the browser 175. In an embodiment, this code associated with the pixel causes a request to be sent to the online system 101. A tracking pixel may be a transparent 1×1 image, an iframe, or other suitable user interface object.

The web server 140C further receives information describing user actions performed with the online system 101 by users via client applications on a client device 102. The web server 140C stores information describing user actions as action logs. Each action log stores a browser identifier associated with the user obtained from the client application, information describing the user action performed, and a time stamp value indicating the time at which the user action was performed. The third party content provider system 170 contacts the online system 101 to get accurate user identifier information associated with the action logs. The details of the interactions between the third party content provider system 170 and the online system 101 are described herein in relation to FIG. 2.

The online system 101 shown in FIG. 1A includes an action logger 115A, an action log 120A, a user profile store 130, a web server 140A, a content store 160A, and a user identity matching module 150.

The user profile store 130 stores user profiles describing users of the online system 101. A user profile includes information about the user that was explicitly shared by the user and may also include profile information inferred by the online system 101. In one embodiment, a user profile includes multiple data fields, each describing one or more attributes of the corresponding user of the online system 101. Examples of information stored in a user profile include biographic, demographic, and other types of descriptive information, such as work experience, educational history, gender, hobbies or preferences, location and the like. A user profile may also store other information provided by the user, for example, images or videos. A user profile in the user profile store 130 may also maintain references to actions by the corresponding user performed on content items in the content store 160A and stored in the action log 120A.

The content store 160A stores objects that each represents various types of content provided by the online system 101. Examples of content represented by an object include a page post, a status update, a photograph, a video, a link, a shared content item, a gaming application achievement, a check-in event at a local business, a brand page, or any other type of content. Online system users may create objects stored by the content store 160A, such as status updates, photos tagged by users to be associated with other objects in the online system, events, groups or applications.

The action logger 115A receives communications about user actions internal to and/or external to the online system 101, populating the action log 120A with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 120A.

The action log 120A may be used by the online system 101 to track user actions on the online system 101. Users may interact with various objects on the online system 101, and information describing these interactions is stored in the action log 120A. Examples of interactions with objects include: commenting on posts, sharing links, and checking-in to physical locations via a mobile device, accessing content items, and any other interactions. Additional examples of interactions with objects on the online system 101 that are included in the action log 120A include: commenting on a photo album, communicating with a user, establishing a connection with an object, joining an event to a calendar, joining a group, creating an event, authorizing an application, using an application, expressing a preference for an object ("liking" the object) and engaging in a transaction.

In one embodiment, a user logs into an account on the online system 101 to access a personalized set of web pages, such as a user profile page and a newsfeed page, using a browser 175. When a user logs in to its account with the online system 101, the online system 101 writes one or more cookies to the client device 102 for storing on the client device, for example, in the local storage 176.

In one embodiment, the online system 101 sends a browser identifier cookie for storing in the local storage 176 of the client device 102 executing the browser 175. The browser identification cookie includes a browser identifier associated with the browser 175 by the online system 101. The online system 101 may retrieve the browser identifier from the browser identification cookie until the browser identification cookie is deleted by a user or by the browser 175. A cookie, for example, the browser identifier cookie is stored in the local storage 176 until it is deleted by the user or deleted by the browser 175.

The online system 101 comprises a user identity matching module 150 for associating browser identifiers associated with users with user identifiers for identifying user profiles. The user identity matching module 150 is further described in relation to FIG. 1B.

System Architecture

Figure 1B:
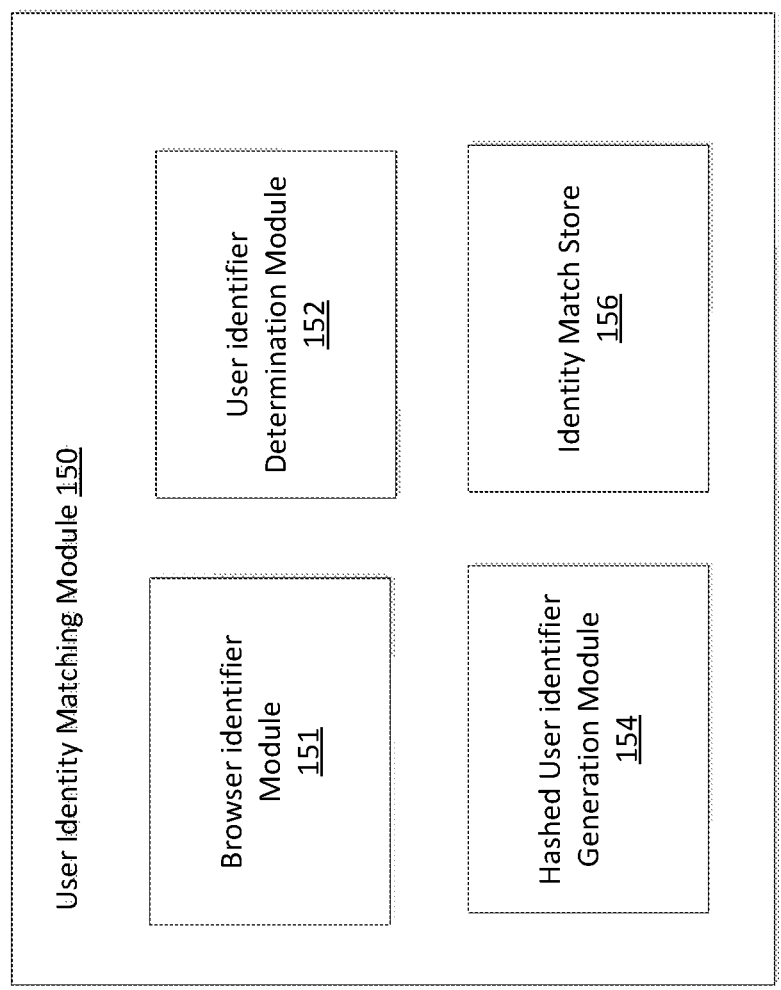
FIG. 1B is a block diagram illustrating the system architecture of a user identity matching module, in accordance with an embodiment of the invention.

FIG. 1B is a block diagram illustrating the system architecture of a user identity matching module, in accordance with an embodiment of the invention. The user identity matching module 150 includes a browser identifier module 151, a user identifier determination module 152, hashed user identifier generation module 154, and identity match store 156 as indicated in FIG. 1B.

The browser identifier module 151 in the user identity matching module 150 determines the browser identifier when it receives a request from a browser 175 of the client device 102. Given a request from a browser 175 of the client device 102, the browser identifier module 151 determines the browser identifier and sends the browser identifier to the client device 102. The online system 101 receives the request from a tracking pixel and invokes the browser identifier determination module 152 to receive the browser identifier.

The browser identifier module 151 receives requests sent as a result of execution of code associated with particular pixels displayed by the client application in client device 102. The browser 175 renders a web page received from the publishing site 105. The web page of the publishing site is unable to access the browser identifier of the online system (stored as a cookie) 101. The browser 175 executes the code associated with the special pixel while presenting content of the third party content provider system 170. The code sends a request to the online system 101 which is received by the browser identifier module 151. The browser identifier module 151 sends a redirect request to the browser of the client device. Since the redirect request is sent by the online system 101, the browser 175 is able to access the browser identifier, furthermore, the redirect request causes the browser 175 to send a request to the third party content provider system 170 causing the third party content provider system 170 to store a user action log based on the browser identifier.

The user identifier determination module 152 determines the user identifier given a browser identifier and a timestamp value. The user identifier determination module 152 identifies and associates user identifiers with browser identifiers based on historical information describing user interactions with the online system 101. The user identifier determination module 152 stores the associations in the identify match store 156. In an embodiment, the identify match store 156 is a database configured to store tables representing relations. The identify match store 156 stores one or more tables that store relations or associations between browser identifiers and user identifiers.

The associations between browser identifiers and user identifiers identify combinations of users and browsers 175 that have accessed the online system 101. For example, a user may access an account on the online system 101 from multiple browsers executing on the same or on different client devices 102. The user identifier determination module 152 may store multiple associations between the user's user identifier and browser identifiers associated with each of the browsers 175 used to access the online system 101. Similarly, multiple users may access the online system 101 from the same browser (e.g., a browser executing on a computer shared by multiple users within a family). The user identifier determination module 152 stores multiple associations between a single browser identifier and various user identifiers.

The user identifier determination module 152 identifies a user that used a browser of a client device at a particular time based on past interactions of the user with the online system 101. The user identifier determination module 152 receives a browser identifier associated with the browser of the client device and a timestamp representing the particular time and determines a user identifier for a user that is likely to have used the browser at that particular time. If the user was logged in to the online system 101 using the browser at that particular time, user identifier determination module 152 assumes that the user that was logged in to the online system 101 was using the browser at that particular time.

If the user was not logged in at that particular time, the user identifier determination module 152 predicts the user corresponding to a browser identifier and a timestamp value based on past user interactions. Techniques for identifying users based on paired identifiers are described in U.S. patent application Ser. No. 13/789,463, filed on Mar. 7, 2013, which is incorporated by reference entirely herein. IP sequencing and clustering techniques are further described in U.S. patent application Ser. No. 14/852,420, filed on Nov. 9, 2015 and U.S. patent application Ser. No. 14/641,256, filed on Mar. 6, 2015, which is incorporated by reference entirely herein.

If the online system 101 receives a request from a user that was not logged into the online system 101 at that particular time, user identifier determination module 152 uses information describing past user actions to identify the user associated with the browser at that particular time. In an embodiment, the user identifier determination module 152 identifies patterns of usage by the various users associated with a browser identifier. For example, if a browser identifier is associated with users U1 and U2, the user identifier determination module 152 determines the time of day when typically a particular uses the browser. If the new request identifies a timestamp associated with a particular time of day, the user identifier determination module 152 identifies the user that used the browser at that time of day with a high likelihood based on past user interactions.

In an embodiment, the online system identifies various parameters received in the browser requests to identify the user associated with the browser at that particular time. These include, a location of the client device executing the browser, an IP address of the client device, the value of the particular time, and so on. The third party content provider system 170 sends to the online system, certain parameters received with the browser request received by the third party content provider system 170. These parameters are in addition to a browser identifier and the timestamp value and include information identifying a geographical location, IP address of the client device, and so on. The user identifier determination module 152 uses the additional parameters to match against the values of the corresponding parameters previously received for the various users associated with the browser identifier and use the matching to identify a particular user. For example, a user U1 may predominantly login from a particular location whereas user U2 may login at another location if a device is shared between two users. The user identifier determination module 152 uses such parameters to determine the user associated with a browser identifier at a time, given the additional parameters received in a request from the user.

In an embodiment, the user identifier determination module 152 uses machine learning techniques to generate a machine learning model for determining the user for a given browser identifier and a timestamp value. For example, the user identifier determination module 152 may generate a machine learning model that is a classifier that takes as input, a browser identifier, a timestamp value, and a user identifier, and returns true if the user corresponding to the user identifier is determined to have used the browser identified by the browser identifier at the time indicated by the timestamp and false otherwise. The machine learning model may be invoked for all user identifiers associated with the browser identifier to determine if the corresponding user used the browser associated with the browser identifier. Other embodiments can use other machine learning techniques for determining a user for a browser identifier and a timestamp value, for example, tree-based models, kernel methods, neural networks, splines, or an ensemble of one or more of these techniques.

The features used by the machine learning model include a location associated with the client device executing the browser, one or more IP addresses associated with the client device executing the browser, the time at which the user has used the browser in the past, and other parameter values received in the request sent by the browser. The machine learning model is trained using features extracted from user requests during time periods for which the user is logged into the online system.

In other embodiments, a rule based system is used to predict the user for a browser identifier and a timestamp value. The rule based system uses the above features identified for the machine learning model. The user identifier determination module 152 stores information describing patterns of usage of the browsers associated with the browser identifiers for various users. For example, the user identifier determination module 152 stores various attributes for each user including ranges of times when a particular user uses the browser based on past login history, locations from which the user uses the browser, IP addresses when the user uses the browser, and so on.

The user identifier determination module 152 associates each attribute with a weight determined based on an estimate of a confidence (or a confidence score) with which the attribute can be used to predict that the user was using the browser at the time. The confidence score is determined based on a rate of success of prediction of the user based on the attribute, for example, for time intervals where the user is known (for example, if the user logged in). In an embodiment, the user identifier determination module 152 determines an aggregated confidence score value for various users associated with the browser identifier by providing the browser identifier and the time stamp value as input and selects the user with the highest confidence score value. In an embodiment, the user identifier determination module 152 determines the score confidence value as a weighted aggregate based on individual confidence score values associated with various attributes received in a request from a browser.

The browser identifier module 151 uses the information stored in the identify match store 176 to determine a browser identifier for a client device 102, for example, if the request received from the browser of the client device does not provide a browser identifier. In some embodiments, the identify match store 176 stores information useful for identifying a browser, for example, a browser type, a vendor of the browser, a version associated with the browser, an internet protocol (IP) address of the client device, and other attributes of the client device. A user may delete the browser identifier stored on the client device, for example, by deleting the cookies stored on the client device. In this situation, the online system 101 uses the information stored in the identity match store to determine the browser identifier for the browser. For example, if the user identifier is associated with a single browser and the user sends a request to log in using the browser after deleting the cookies on the client device, the use identity match module 150 retrieves the browser identifier associated with the user identifier for the user from the identify match store 156 and sends it to the browser 175 for storing in the local storage 176 of the client device 102. If the user identifier is associated with multiple browsers, the online system 101 uses additional information received from the browser used to connect to the online system to determine the browser identifier for the browser used to connect with the online system 101 and sends the browser identifier for storing in the local storage 176 of the client device 102. If there is no browser identifier associated with the user or if the browser or client information does not match with any existing browsers associated with the user, the browser identifier module 151 creates a new browser identifier for the browser and creates an association between the new browser identifier and the user identifier and send the browser identifier for storing in the local storage 176 of the client device 102.

The hashed user identifier generation module 154 uses a hash function to generate a hashed value based on the user identifier. The online system 101 sends the hashed user identifier to the third party content provider system 170. The identity match store 156 stores the mapping from parameters received in a request from a client device 102 to a browser identifier. In some embodiments, the browser identifier may be stored on the client device 102 as a cookie but it is not available to web pages received from systems other than the online system 101 that are accessed by the client device 102.

The report generation module 185 prepares the report based on the hashed user identifier sent by the online system 101 corresponding to the browser identifier and timestamp. The report generation module 185 may generate reports that provide statistical information describing user interactions with a content item provided by the third party content provider system 170, for example, the total number of distinct users that interacted with the content item, the total number of distinct users that interacted with the content item during a time window, variation of the number of users interacting with the content item over time, and so on. The report generation module 185 may generate reports based on interactions between a particular user and a content item, for example, a report describing all interactions of a user and a content item. The report generation module 185 may generate reports describing a specific interaction between a particular user and a content item, for example, a report describing a time and the publishing site associated with a specific interaction with the content item. The report generation module 185 may generate reports describing user interactions for a particular user, for example, report based on all user interactions of the user with various content items of the content provider systems, user interactions of the user with a specific set of content items of the content provider systems, or user interactions of the user with content items of the content provider systems performed during a particular time interval.

Overall Process for Matching Identity Across Systems

Figure 2:
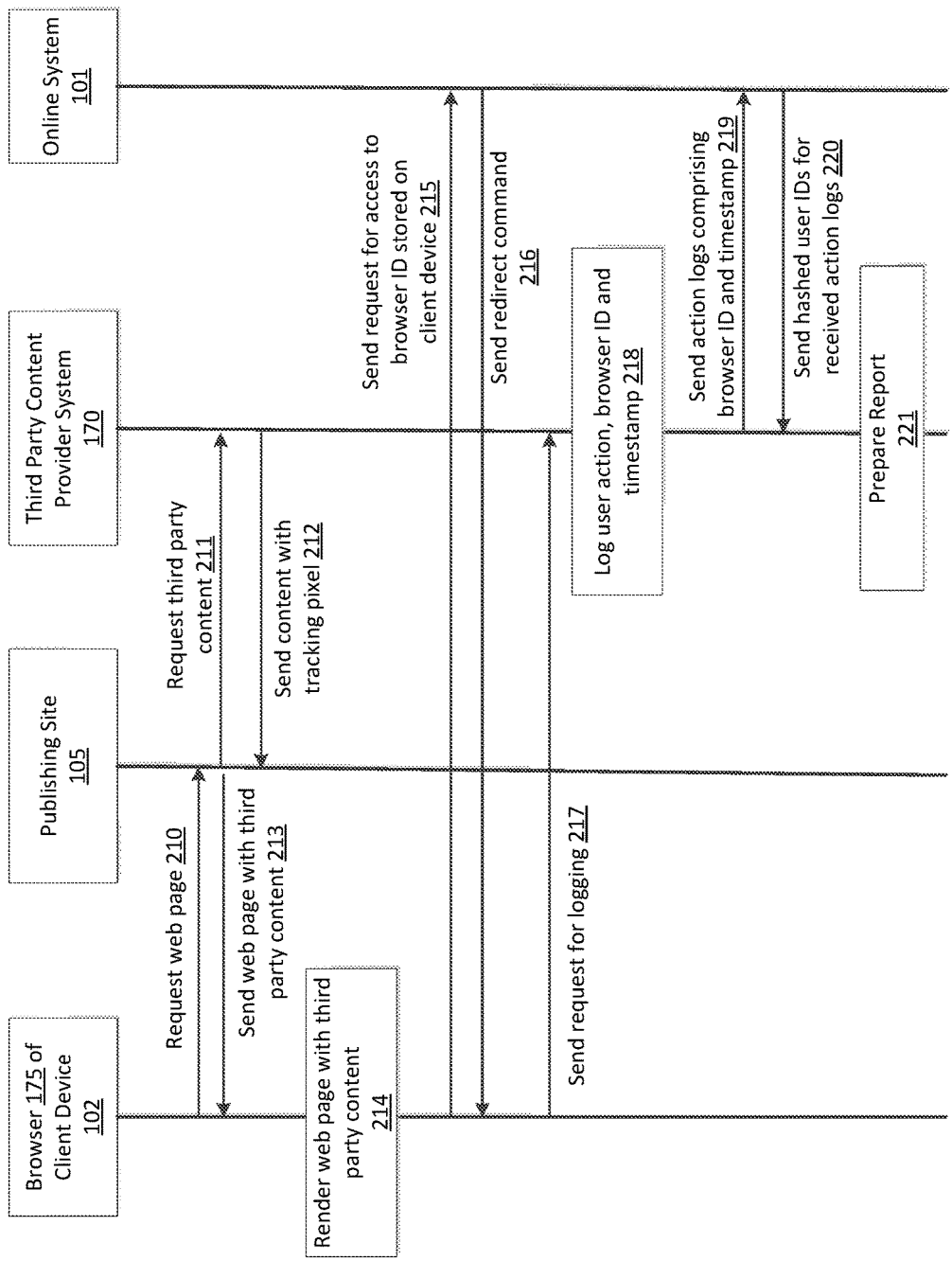
FIG. 2 is an interaction diagram illustrating tracking of content distributed by a third party content provider system, in accordance with an embodiment of the invention.

FIG. 2 is an interaction diagram illustrating tracking of content distributed by a third party content provider system, in accordance with an embodiment of the invention. The various systems interacting include an online system 101, a third party content provider system 170, a publishing site 105, and a client device 102. In other embodiments, there may be more or fewer systems interacting.

The client device 102 interacts with the online system 101 as well as with the publishing site 105. A user of the client device may interact with the online system 101 using the browser 175 for using the features provided by the online system 101. For example, if the online system 101 is a social networking system, a user may connect with the social networking system to receive news feed, to interact with the users connections on the social networking system, and so on. The browser identifier module 151 of the online system 101 determines a browser identifier for the browser 175 of the client device 102 and sends it for storing in a local storage of the client device 102. In an embodiment, the browser 175 of the client device 102 stores the browser identifier received from the online system 101 in a portion of the local storage of the client device that can be accessed only by web pages received by the client device 102 from the online system 101. For example, instructions included in a web page received from then online system 101 is allowed to access the browser identifier or other data stored in this portion of the local storage of the client device. Accordingly, web pages received by the browser 175 from other systems that are distinct from the online system 101 (for example, publishing site 105) are not allowed to access the data stored in this portion of the local storage of the client device. Accordingly, the browser identifier can be accessed by web pages received by the browser 175 from the online system 101 but cannot be accessed by web pages received by the browser 175 from other systems including the publishing site 105.

A browser 175 executing on a client device 102 requests 210 a web page from the publishing site 105. The requested web page includes content provided by the third party content provider system 170. Accordingly, the publishing site 105 sends 211 a request to the third party content provider system 170, requesting a content item from the third party content provider system 170. The third party content provider system 170 identifies the requested content item and sends 212 the requested content item to the publishing site. In an embodiment, the third party content provider system 170 provides a tracking pixel with the content sent 212 to the publishing site 105. The publishing site 105 configures a web page that includes the content received from the third party content provider system 170 and sends 213 the web page for presentation via a display screen of the client device The web browser 175 of the client device 102 renders 214 the web page with the content provider content at the client device 102. Since the web page was received by the browser 175 from the publishing site 105, the web page is unable to access the browser identifier provided by the online system 101 and stored on the client device 102. The web browser 175 of the client device 102 sends 215 a request for access to the browser identifier stored on the local storage of the client device 102.

In an embodiment, the browser 175 generates the request for the browser identifier in response to rendering the tracking pixel received by the browser 175 with the web page. As described above, the tracking pixel is associated with the content provided by the third party content provider system 170. The tracking pixel is configured to execute instructions to send 215 the request for access to the browser identifier in response to the browser 175 rendering the tracking pixel.

In response to the request received from the browser 175 of the client device 102, the browser identifier module 151 of the online system 101 sends 216 a web page to the browser 175 that allows the browser 175 to access the browser identifier. The browser 175 is able to access the browser identifier since the web page processed by the browser 175 is sent 216 by the online system 101. In an embodiment, the web page sent 215 by the online system 101 comprises a redirect command that causes the browser 175 to further interact with the third party content provider system 170.

The browser 175 sends 217 a request for logging the user interaction with the publishing site that caused the publishing site 105 to send a web page including content received from the third party content provider system 170. The request sent 217 by the browser 175 includes the browser identifier and may include a timestamp value associated with the user interaction, for example, the timestamp representing the time at which the content received from the third party content provider system 170 was presented to the user via the browser 175.

The third party content provider system 170 logs 218 information describing the user action including the browser identifier and the timestamp associated with the activity of the corresponding user in the action log 120C. In an embodiment, each action log also includes information identifying the publishing site 105 with which the client device 102 performed the interaction. The third party content provider system 170 continuously logs user actions involving publishing systems that present content received from the third party content provider system 170. Each log stored in action log 120C by the third party content provider system 170 is associated with a browser identifier representing the user that performed the user action.

The third party content provider system 170 further receives a request to generate a report based on the user actions logged by the third party content provider system 170. For example, the third party content provider system 170 may receive a request to generate a report describing a rate (or a change in rate over time) with which user actions are performed with a specific type of content or a specific content item. The third party content provider system 170 may generate the report using the browser identifiers as representing the users performing the interactions. For example, to count the number of users that interacted with a content item, the third party content provider system 170 may count the number of browser identifiers logged in action logs describing user interactions with the content item. However, the report may be inaccurate if multiple users share the same client device 102 (and the browser 175 of the client device) or if the same user uses multiple browsers. Accordingly, there may not be a one-to-one relationship between browser identifiers and users performing the user actions.

Therefore, the third party content provider system 170 interacts with the online system 101 to get a more accurate association between users and action logs. The third party content provider system 170 sends 219 to the online system 101, browser identifiers and timestamps associated with one or more user actions logged in action log 120C of the third party content provider system 170. In an embodiment, the third party content provider system 170 sends other parameters received from the browser in the requests received from the browser to the online system 101, for example, a location of the client device, an IP address associate with the client device, and so on.

The online system 101 determines a user for each pair of browser identifier and the timestamp value. The user identifier determination module 152 may map a browser identifier ID1 to a user U1 at timestamp representing time T1 and the same browser identifier ID2 to a user U2 at timestamp representing time T2. For example, if the same client devices is shared between users U1 and U2, and the online system 101 stores information that user U1 logged into the online system 101 using the browser with browser identifier ID1 at time T1 and the user U2 logged into the online system 101 using the same browser (with browser identifier ID1) at time T2. The user identifier determination module 152 identifies the user corresponding to each browser identifier and timestamp value received from the third party content provider system 170 and determines their corresponding user identifiers. In an embodiment, the user identifier determination module 152 uses the various parameters received from the third party content provider system 170 to determine the user associated with the browser.

The online system 101 does not share the user identifiers used by the online system 101 for identifying users with other systems. Therefore, the online system 101 invokes the hashed user identifier determination module to map each user identifier to a hashed user identifier that is distinct from the user identifier used internally by the online system 101. The online system 101 sends 220 to the third party content provider system 170, the hashed user identifiers corresponding to the logs received from the user identifier determination module 152.

The third party content provider system 170 prepares 221 the requested report using the report generation module 185. The third party content provider system 170 generates the report using the hashed user identifiers associated with the browser identifier and the timestamp pairs corresponding to each action log. Using the hashed user identifiers for generating the report allows the third party content provider system 170 to generate a report based on more accurate user information compared to a report generated using conventional techniques.

Timestamp Generation and Prediction

Figure 3:
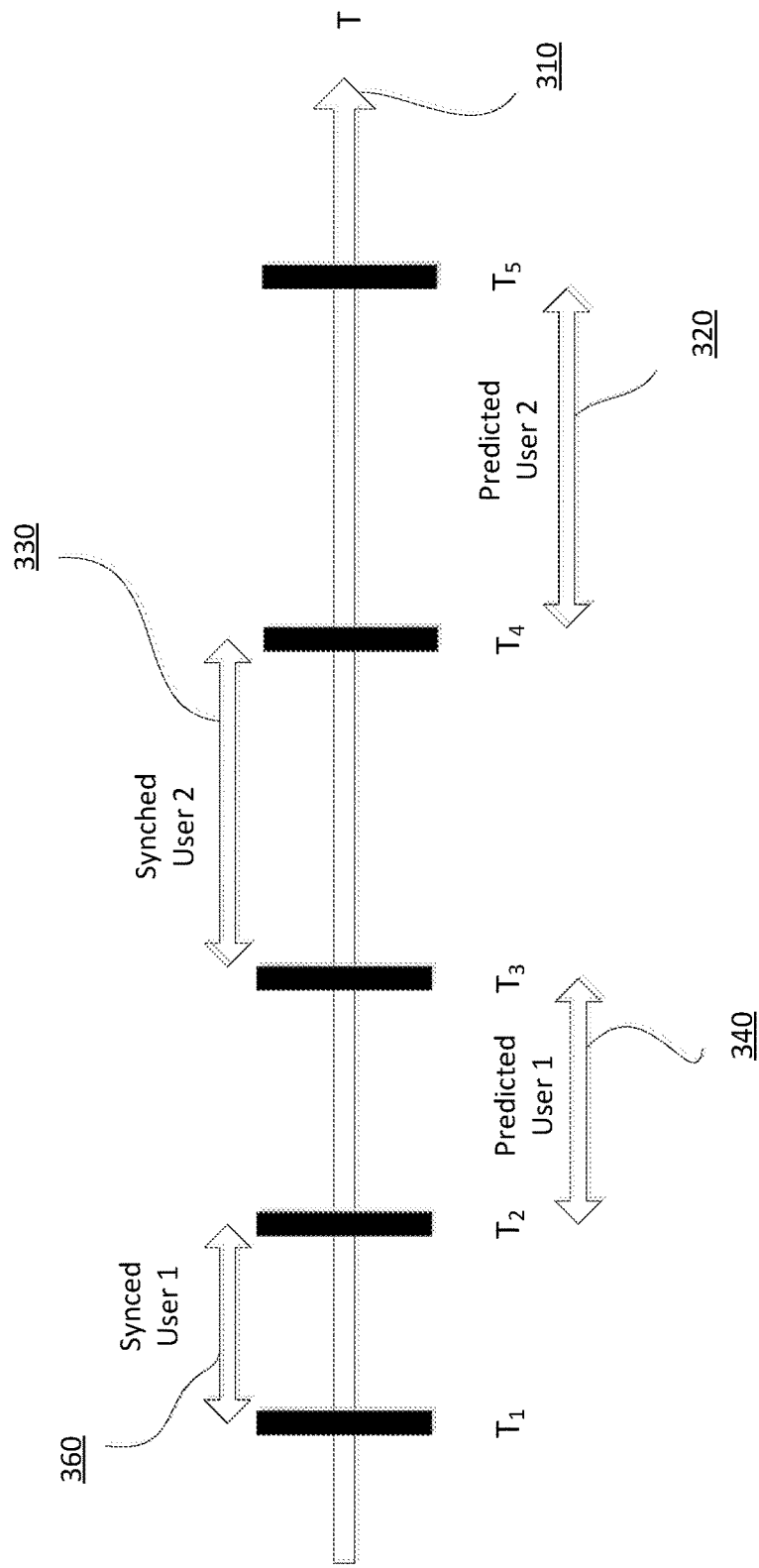
FIG. 3 is an illustrative example of timestamp generation, and prediction of users on a shared device/browser according to an embodiment of the invention

FIG. 3 is an illustrative example of timestamp generation and prediction of users on a shared device/browser according to an embodiment of the invention. In one example, the time period 360 between the T1 and T2 correspond to identification of the user 1 of the online system 101 by the user identifier determination module 152 based on logging in of user 1 into the online system 101. The time period 330 between the T3 and T4 correspond to the identification of the user 2 of the online system 101 received by the user identifier determination module 152 based on logging in of user 2 into the online system 101. The time period 340 between the T2 and T3 corresponds to no user associated with the online system logging into the online system. During this time period the user identifier determination module 152 predicts user 1 of online system 101 as having used the browser. The time period between the T4 and T5 corresponds to the to no user associated with the online system logging into the online system. During this time period the user identifier determination module 152 predicts user 2 of online system 101 as having used the browser.

FIG. 4 is an illustrative example of a match table 400 indicating the matching of an event with the browser identifier, timestamp, and hashed user identifier. The identity match store 156 may store information as illustrated in FIG. 4. Each hashed user identifier is matched with a combination of a browser identifier and timestamp corresponding to an event. The user identifier determination module 152 maps (browser_id1, timestamp1) to a user identifier called 'identifier1' and maps (browser_id1, timestamp2) to a user identifier called 'identifier2.' Accordingly, the identifier determination module 152 maps the same browser identifier to different user identifiers at different times. In this embodiment, the same client device 102 is used by different users of the online system 101 at different times.

The user identifier determination module 152 may map (browser_id1, timestamp1) to a user identifier identifier1 and (browser_id2, timestamp2) to a user identifier identifier1. Accordingly, the two different browser identifiers are mapped to the same user identifier for user actions performed at different times. Accordingly, user identifier determination module 152 maps the same user to different devices/browsers. Accordingly, the same hashed user identifier 'a10bdzz' 410 generated from the hashed user identifier generation module 154 is associated with two different browser identifiers and timestamps.

Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   storing, by an online system, user profiles of users of the online system;
   receiving, by the online system, user interactions from a browser executing on a client device of a user;
   determining, by the online system, a browser identifier for uniquely identifying the browser executing on the client device;
   sending, by the online system, the browser identifier for storing on the client device;
   sending, by a content provider system, content for display by the browser of the client device, wherein the content includes a tracking pixel configured to cause the browser of the client device to send a request to the online system;
   responsive to receiving a first request caused by the tracking pixel, sending, by the online system, a redirect request to the browser, the redirect request causing the browser to send a second request to the content provider system, the second request including the browser identifier stored in a storage area of the client device;
   storing, by the content provider system, user action logs describing user interactions with content distributed by the content provider system, each user action log storing information describing a user action performed using a particular browser executing on a particular client device, a timestamp indicating a time of the user action, and a browser identifier identifying the particular browser and obtained from the particular client device;
   receiving, by the online system, from the content provider system, information describing one or more user action logs, the information comprising, for each of the one or more user action logs, a browser identifier and a timestamp;
   determining, by the online system, for each of the one or more user action logs, a user associated with the browser identifier of the user action log, the determining based on user interactions performed by the user with the online system using a browser associated with the browser identifier of the user action log;
   sending, by the online system, for each of the one or more user action logs, a user identifier for the determined user; and generating, by the content provider system, a report describing user interactions associated with content distributed by the content provider system, the report using the user identifiers received from the online system.

2. The method of claim 1, wherein the content provider system sends the content to a publishing system for including in a web page sent by the publishing system to the client device.

3. The method of claim 1, wherein the browser identifier is stored as a cookie associated with the online system on the client device.

4. The method of claim 1, wherein the user identifier is an external user identifier, wherein the online system stores an internal user identifier associated with the user profile of each user, wherein the external user identifier is obtained by applying a hash function to the internal user identifier.

5. The method of claim 1, wherein determining, by the online system, a user associated with the browser identifier stored in the user action log comprises:
identifying a first user for a first browser id and a first timestamp value and identifying a second user for the first browser id and a second timestamp value.

6. The method of claim 1, wherein determining, by the online system, a user associated with the browser identifier stored in the user action log comprises:
identifying a first user for a first browser id and a first timestamp value and identifying the first user for a second browser id and a second timestamp value.

7. A method comprising:
receiving, by a content provider system, from a publishing site, a request for content for including in a web page sent by the publishing site to a browser of a client device;
responsive to receiving the request for content, sending, by the content provider system, the requested content for display by the browser of the client device, wherein the requested content includes a tracking pixel configured to cause the browser of the client device to send a first request to an online system, wherein the online system sends a redirect request to the browser responsive to receiving the first request caused by the tracking pixel, the redirect request causing the browser to send a second request to the content provider system;
receiving, by the content provider system, from the browser of the client device, the second request identifying a user action associated with the content, the second request including a browser identifier stored in a storage area of the client device, wherein the client device received the browser identifier from an online system;
storing by the content provider system, one or more user action logs, the storing comprising, responsive to receiving the request identifying the content, storing a user action log comprising information describing the user action, a timestamp associated with the user action, and the browser identifier;
sending, by the content provider system, to the online system, information describing the one or more user action logs, the information comprising, for each of the one or more user action logs, a browser identifier and a timestamp;
receiving, by the content provider system, from the online system, for each of the one or more user action logs, a user identifier associated with the browser identifier stored in the user action log; and generating, by the content provider system, a report describing user actions, the report based on the user identifiers received from the online system.

8. The method of claim 7, wherein the online system determines the user identifier for a user based on a likelihood of the user using the client device at the time indicated by the timestamp of the user action log.

9. The method of claim 7, wherein web pages sent to the client device by the content provider system are restricted from accessing information stored in the storage area.

10. The method of claim 7, wherein the browser identifier is stored on the client device as a cookie associated with the online system, wherein web pages sent to the client device by the content provider system are restricted from accessing the cookie.

11. A non-transitory computer readable storage medium, storing instructions for:
receiving, by a content provider system, from a publishing site, a request for content for including in a web page sent by the publishing site to a browser of a client device;
responsive to receiving the request for content, sending, by the content provider system, the requested content for display by the browser of the client device, wherein the requested content includes a tracking pixel configured to cause the browser of the client device to send a first request to an online system, wherein the online system sends a redirect request to the browser responsive to receiving the first request caused by the tracking pixel, the redirect request causing the browser to send a second request to the content provider system;
receiving, by the content provider system, from the browser of the client device, the second request identifying a user action associated with the content, the second request including a browser identifier stored in a storage area of the client device, wherein the client device received the browser identifier from an online system;
storing by the content provider system, one or more user action logs, the storing comprising, responsive to receiving the request identifying the content, storing a user action log comprising information describing the user action, a timestamp associated with the user action, and the browser identifier;
sending, by the content provider system, to the online system, information describing the one or more user action logs, the information comprising, for each of the one or more user action logs, a browser identifier and a timestamp;
receiving, by the content provider system, from the online system, for each of the one or more user action logs, a user identifier associated with the browser identifier stored in the user action log; and
generating, by the content provider system, a report describing user actions, the report based on the user identifiers received from the online system.

12. The non-transitory computer readable storage medium of claim 11, wherein the online system determines the user identifier for a user based on a likelihood of the user using the client device at the time indicated by the timestamp of the user action log.

13. The non-transitory computer readable storage medium of claim 11, wherein web pages sent to the client device by the content provider system are restricted from accessing information stored in the storage area.

14. The non-transitory computer readable storage medium of claim 11, wherein the browser identifier is stored on the client device as a cookie associated with the online system, wherein web pages sent to the client device by the content provider system are restricted from accessing the cookie.

\* \* \* \* \*